United States Patent
Suzuki et al.

(10) Patent No.: US 11,762,472 B2
(45) Date of Patent: Sep. 19, 2023

(54) INPUT DEVICE AND INPUT MODULE

(71) Applicant: Alps Alpine Co., Ltd., Tokyo (JP)

(72) Inventors: Hajime Suzuki, Miyagi (JP); Hiroshi Wakuda, Miyagi (JP); Ko Owada, Fukushima (JP); Tetsu Numata, Miyagi (JP); Toshiki Tachioka, Miyagi (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/865,509

(22) Filed: Jul. 15, 2022

(65) Prior Publication Data

US 2022/0350412 A1  Nov. 3, 2022

Related U.S. Application Data

(63) Continuation of application No. PCT/JP2021/000315, filed on Jan. 7, 2021.

(30) Foreign Application Priority Data

Feb. 5, 2020 (JP) .............................. 2020-017990

(51) Int. Cl.
*G06F 3/041* (2006.01)
*G06F 3/01* (2006.01)
*G06F 3/02* (2006.01)
*G06F 3/0354* (2013.01)

(52) U.S. Cl.
CPC ............ *G06F 3/016* (2013.01); *G06F 3/0202* (2013.01); *G06F 3/03547* (2013.01)

(58) Field of Classification Search
CPC ..... G06F 3/016; G06F 3/0202; G06F 3/03547; G06F 3/041
See application file for complete search history.

(56) References Cited

U.S. PATENT DOCUMENTS 6,486,579 B1 * 11/2002 Furuya ................. G06F 3/016
  310/81
8,659,402 B2 * 2/2014 Wakita ............... G06F 3/03548
  340/407.1
8,809,716 B2 * 8/2014 Gohng ................. G06F 3/0362
  200/336

(Continued)

FOREIGN PATENT DOCUMENTS

CN  109070138 A  12/2018
EP  2192469 A2 * 6/2010 ............. G06F 3/016

(Continued)

OTHER PUBLICATIONS

International Search Report for corresponding International Application No. PCT/JP2021/000315 dated Mar. 16, 2021 (2 Pages).

*Primary Examiner* — Joe H Cheng
(74) *Attorney, Agent, or Firm* — Harness, Dickey & Pierce, P.L.C.

(57) ABSTRACT

An input device and an input module are provided that vibrate in a direction along the surface of a cantilevered operation unit. The input device includes a fixed member rotatably supporting a rotation shaft, an operation unit having an end rotatably supported by the rotation shaft and being rotatable relative to the fixed member, and a vibrating element that generates vibration of the operation unit in the axial direction of the rotation shaft in response to a rotation operation performed on the operation unit.

11 Claims, 16 Drawing Sheets

(56) References Cited

U.S. PATENT DOCUMENTS

| | | | |
|---|---|---|---|
| 9,182,825 B2 | 11/2015 | Schneider et al. | |
| 9,594,429 B2* | 3/2017 | Bard | G06F 3/016 |
| 9,600,071 B2* | 3/2017 | Rothkopf | G06F 3/016 |
| 10,496,173 B2* | 12/2019 | Wakuda | G06F 3/038 |
| 10,556,252 B2* | 2/2020 | Tsang | G06F 3/016 |
| 10,585,480 B1* | 3/2020 | Bushnell | G06F 3/0202 |
| 10,649,529 B1* | 5/2020 | Nekimken | G06F 1/1688 |
| 10,768,738 B1* | 9/2020 | Zhang | G06F 3/016 |
| 10,916,108 B2* | 2/2021 | Wakuda | G05G 1/08 |
| 11,435,832 B2* | 9/2022 | Wakuda | B06B 1/06 |
| 11,531,462 B2 | 12/2022 | Gomi et al. | |
| 2002/0149561 A1* | 10/2002 | Fukumoto | G06F 3/04886 |
| | | | 345/156 |
| 2011/0141052 A1* | 6/2011 | Bernstein | G06F 3/041 |
| | | | 341/5 |
| 2013/0187879 A1 | 7/2013 | Koga et al. | |
| 2014/0094309 A1* | 4/2014 | Osawa | G06F 3/038 |
| | | | 463/37 |

FOREIGN PATENT DOCUMENTS

| | | |
|---|---|---|
| EP | 3557382 A1 | 10/2019 |
| EP | 3570143 A1 | 11/2019 |
| JP | 2013-168134 A | 8/2013 |
| JP | 2017-204299 A | 11/2017 |
| JP | 2019-028729 A | 2/2019 |
| JP | 2019-188285 A | 10/2019 |
| JP | 2019-200638 A | 11/2019 |

\* cited by examiner

INPUT DEVICE AND INPUT MODULE

CLAIM OF PRIORITY

This application is a Continuation of International Application No. PCT/JP2021/000315 filed on Jan. 7, 2021, which claims benefit of Japanese Patent Application No. 2020-017990 filed on Feb. 5, 2020. The entire contents of each application noted above are hereby incorporated by reference.

BACKGROUND OF THE INVENTION

1. Field of the Invention

The present invention relates to an input device and an input module.

2. Description of the Related Art

A haptic feedback device has been developed that includes a cantilever member having one end fixed and the other end swingable with the one end being the fulcrum, an actuator, and a touch pad disposed on the other surface side of the cantilever member. The cantilever member has a holding portion that holds the actuator on one surface side of the cantilever member in the extending direction of the cantilever member. When pressed by a touching object from the other surface side, the cantilever member is displaced, and the actuator is compressed, and when the actuator expands, a force opposite to the pressing force is generated on the cantilever member to provide haptic feedback to the touching object. The actuator is expanded and contracted and is displaced in accordance with the touch position of the touching object. When the actuator is expanded and contracted so as to be displaced, the free end of the cantilever member is displaced up and down in a swingable manner about the fixed end serving as the fulcrum (refer to, for example, Japanese Unexamined Patent Application Publication No. 2017-204299).

Note that in existing haptic feedback devices, since the free end of the cantilever member is displaced up and down in a swingable manner about the fixed end serving as the fulcrum, the vibration of the cantilever member is generated in the direction of penetrating the surface of the cantilever member. When the cantilever member is used as an operation unit, the operation unit that vibrates in the direction of penetrating the surface of the operation unit may be difficult to use. In particular, the operational feel generated in the fixed end of the cantilever member may differ from that in the free end.

Accordingly, the present invention provides an input device and an input module that vibrate in the direction of the surface of a cantilevered operation unit.

SUMMARY OF THE INVENTION

According to an embodiment of the present invention, an input device includes a fixed member configured to rotatably support a rotation shaft, an operation unit having one end rotatably supported by the rotation shaft, where the operation unit is rotatable relative to the fixed member, and a vibrating element configured to generate vibration of the operation unit in an axial direction of the rotation shaft in response to a rotation operation performed on the operation unit.

DESCRIPTION OF THE PREFERRED EMBODIMENTS

An embodiment using an input device and an input module of the present invention is described below.

Embodiment

Figure 1:
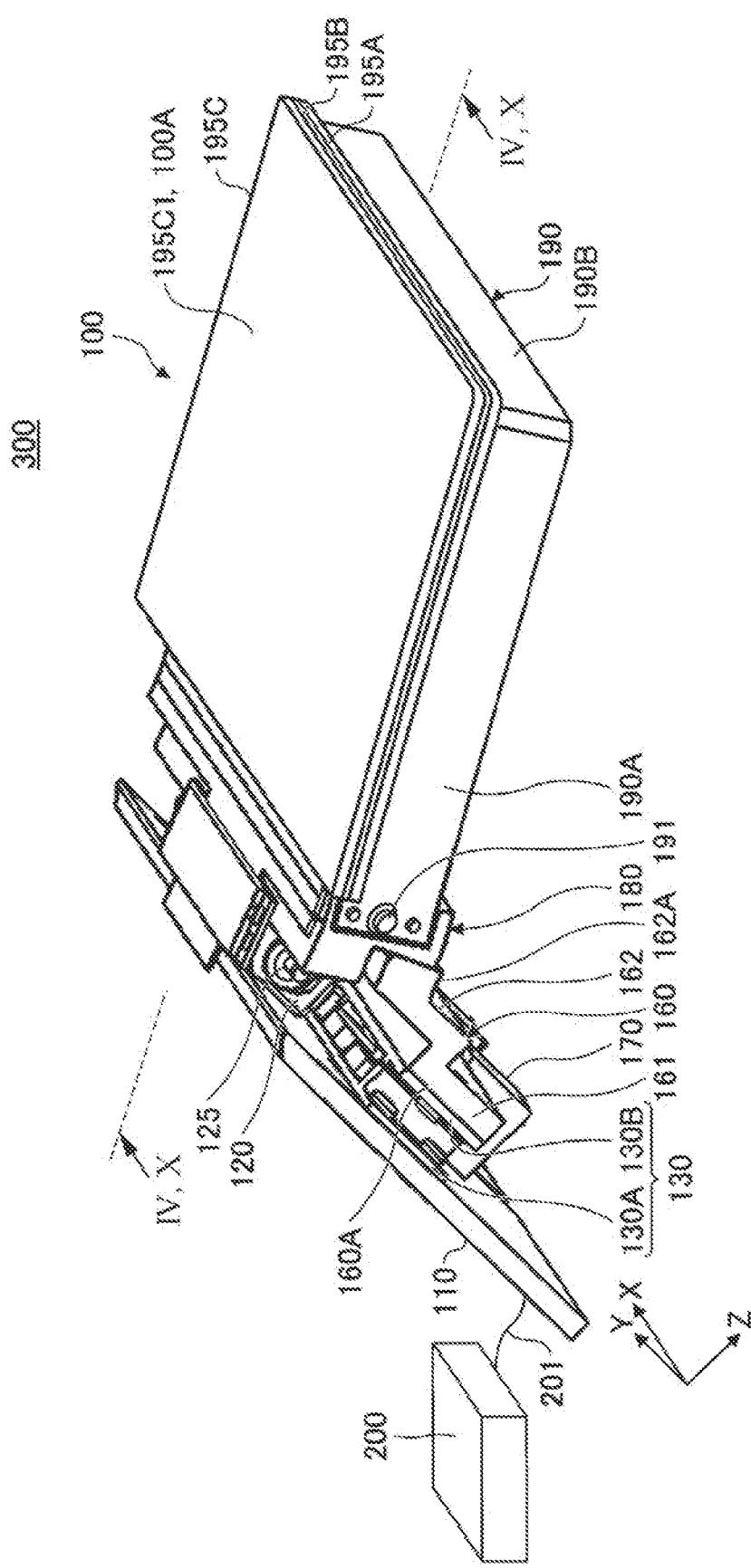
FIG. 1 is a perspective view of an input module according to an embodiment.

FIG. 1 is a perspective view of an input module 300 according to the embodiment. The input module 300 includes an input device 100 and a control device 200.

Figure 2:
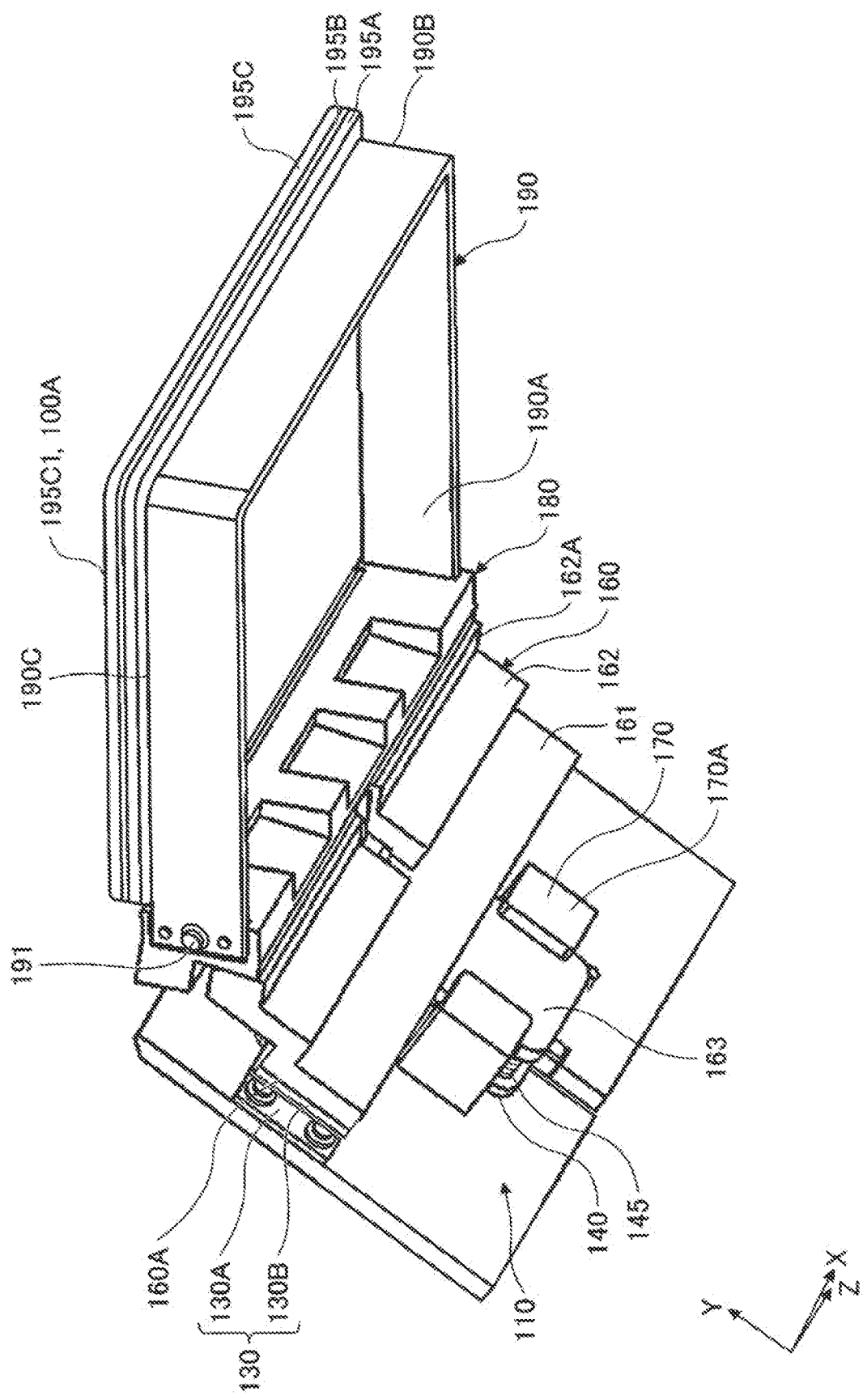
FIG. 2 is a perspective view of an input device.
Figure 3:
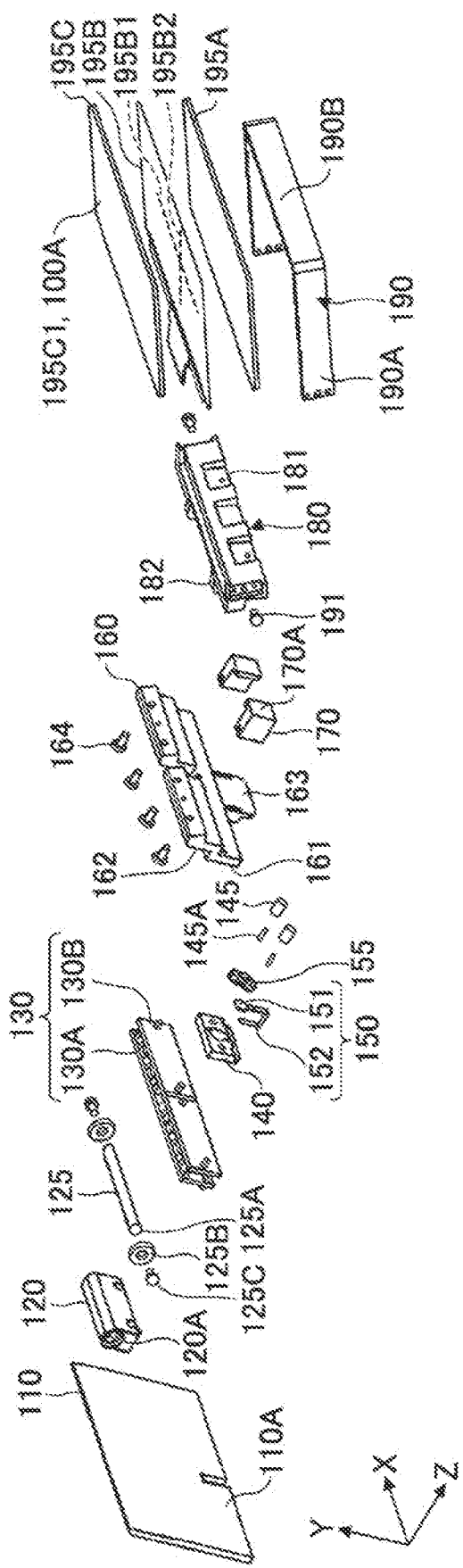
FIG. 3 is an exploded view of the input device.
Figure 4:
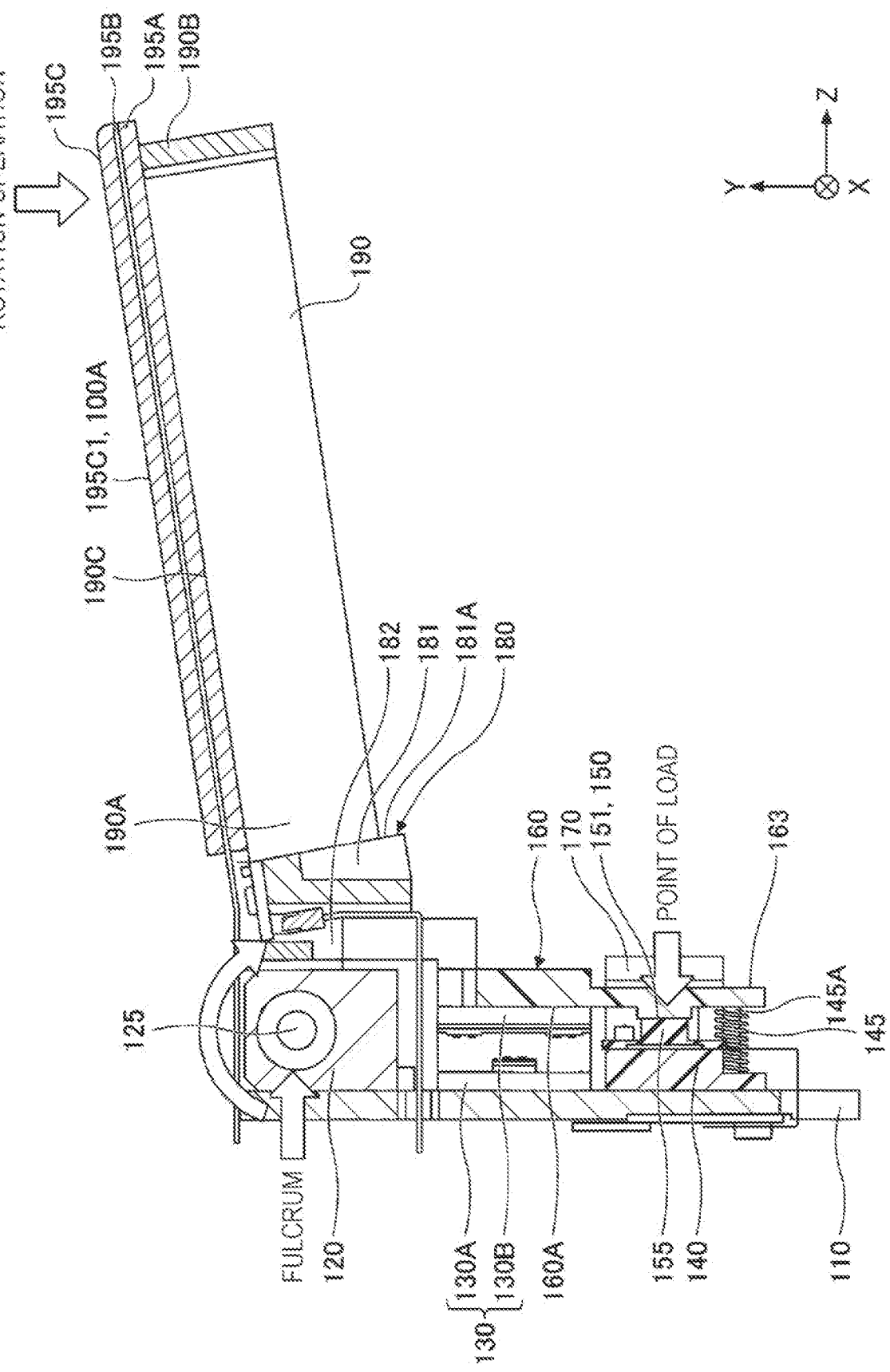
FIG. 4 is a cross-sectional view taken along a line IV-IV of FIG. 1.
Figure 5:
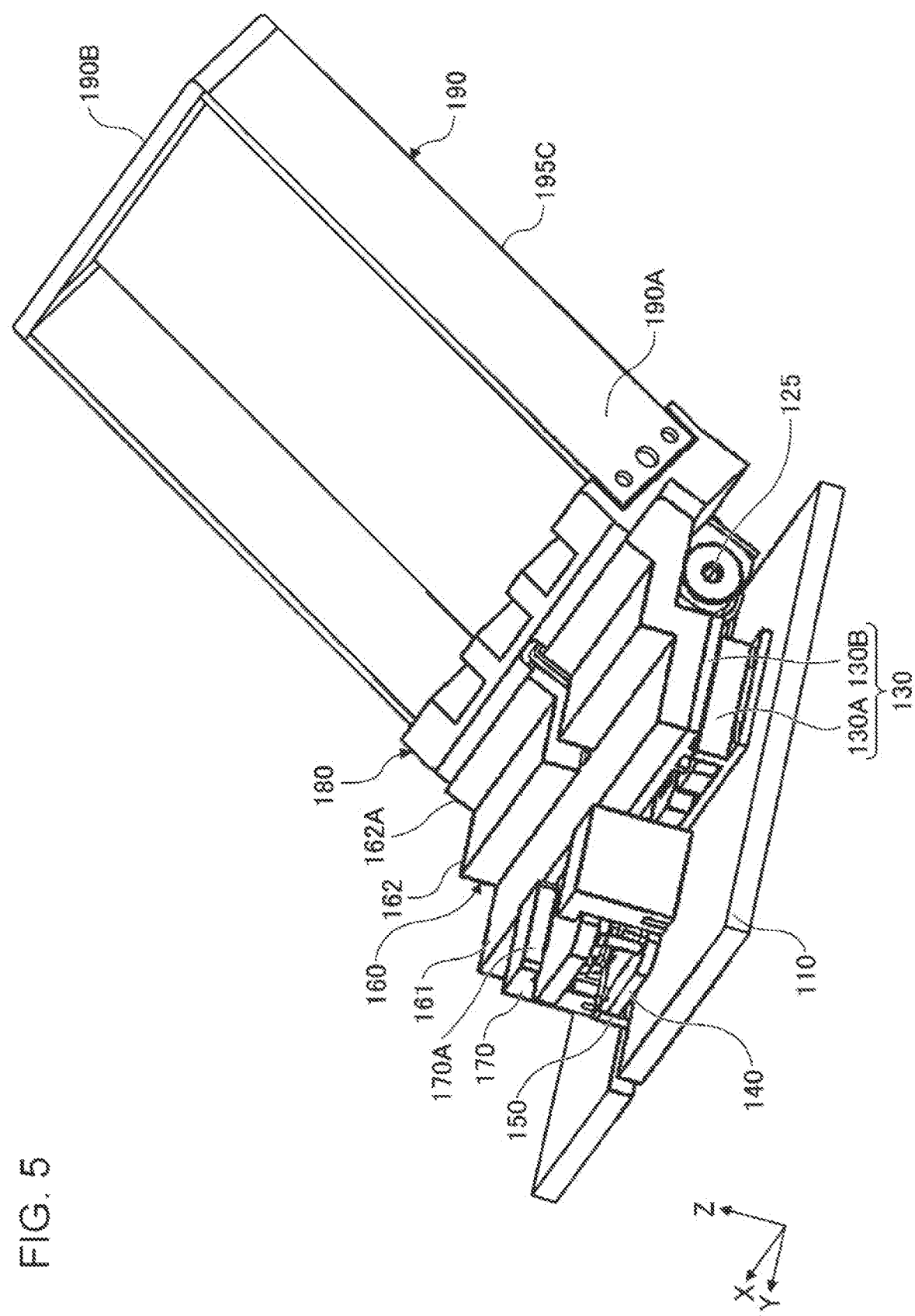
FIG. 5 is a perspective view of the input device.
Figure 6:
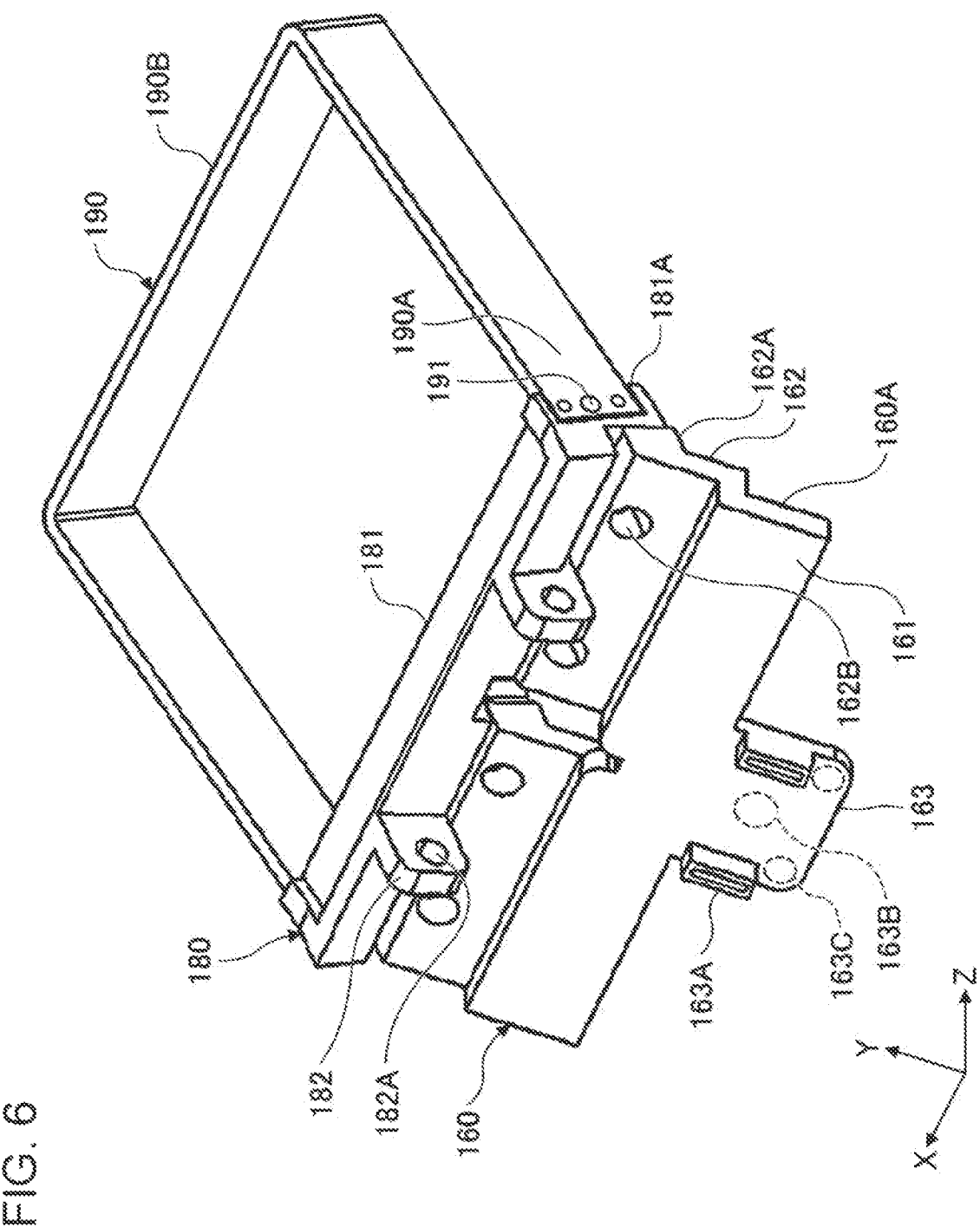
FIG. 6 is a perspective view of a holder, a base, and a frame.
Figure 7A:
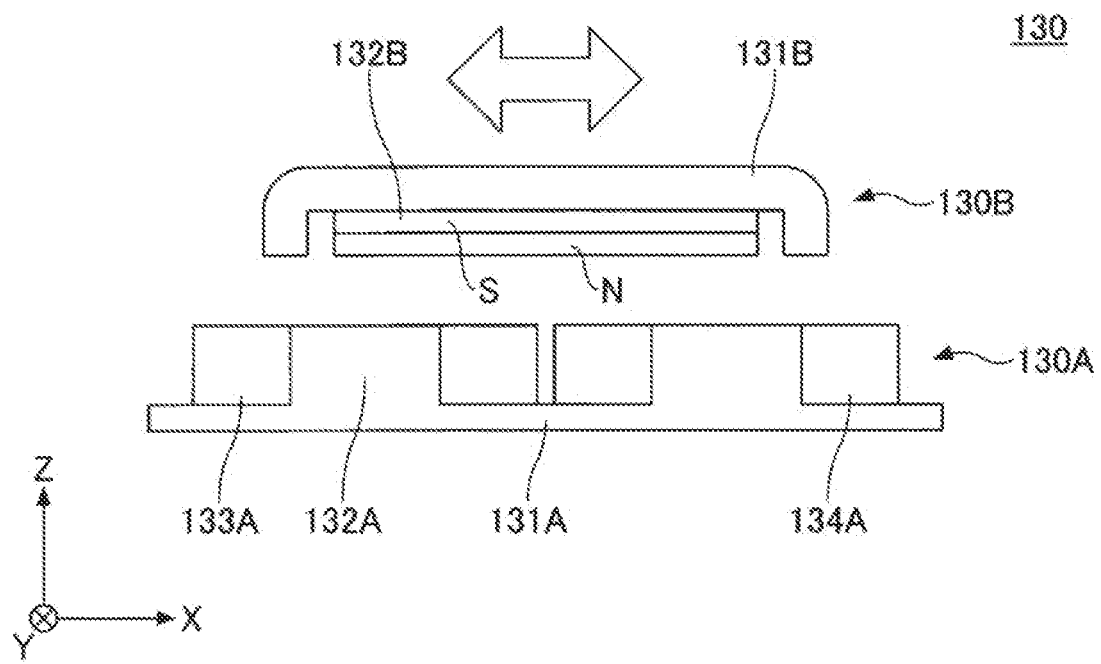
FIG. 7A illustrates an actuator.
Figure 7B:
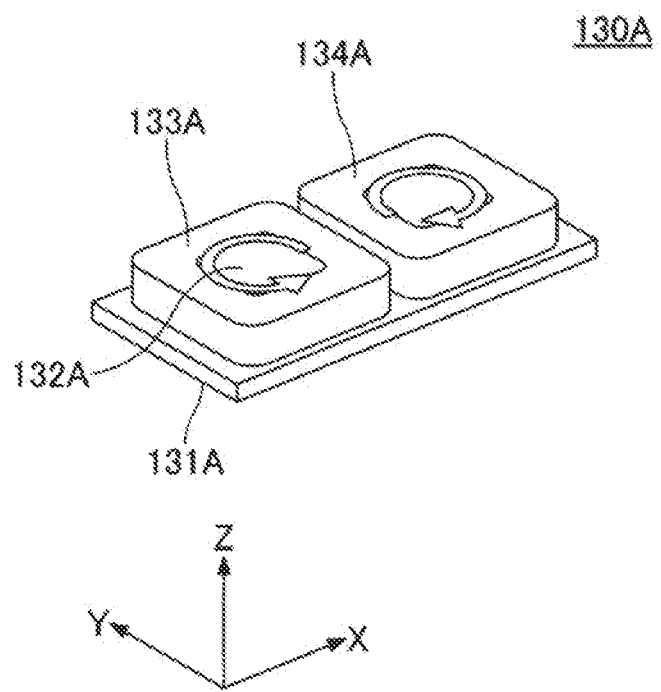
FIG. 7B illustrates a fixed part of the actuator.
Figure 8:
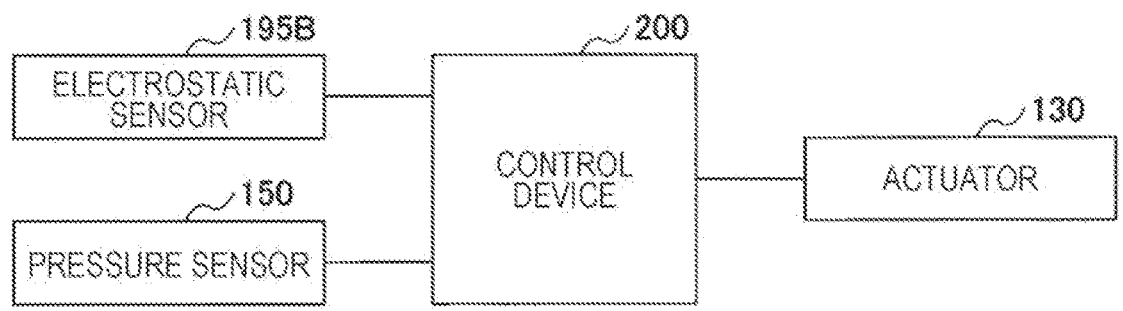
FIG. 8 is a block diagram illustrating the configuration of the input device.

The description below is made with reference to FIG. 2 to FIG. 8 in addition to FIG. 1. FIG. 2 is a perspective view of the input device 100. FIG. 3 is an exploded view of the input device 100. FIG. 4 is a cross-sectional view taken along a line IV-IV of FIG. 1. FIG. 5 is a perspective view of the input device 100. FIG. 6 is a perspective view of a holder 160, a base 180, and a frame 190. FIG. 7A illustrates an actuator 130. FIG. 7B illustrates a fixed part 130A of the actuator 130. FIG. 8 is a block diagram of the configuration of the input device 100. Note that in FIG. 5, a knob 195A, an electrostatic sensor 195B, and a cover 195C are not illustrated. In addition, except for FIGS. 1 and 8, the control device 200 is not illustrated.

The input device 100 includes a board 110, a linear bush 120, a shaft 125, an actuator 130, a pedestal 140, a pressure sensor 150, a damper 155, the holder 160, supporters 170, the base 180, the frame 190, the knob 195A, the electrostatic sensor 195B, and the cover 195C.

The control device 200 is, for example, a computer system, such as a microcomputer. The control device 200 is configured by a computer including a CPU (Central Processing Unit), a RAM (Random Access Memory), a ROM (Read Only Memory), a nonvolatile memory, an internal bus, and the like.

Description is made below by defining the XYZ coordinate system. The XY plane is parallel to a surface 110A of the board 110. In addition, for convenience of description, the plan view is the XY plane view. In terms of a vertical relationship, the positive Z-axis direction is the upward direction, and the negative Z-axis direction is the downward direction. However, the vertical relationship is not a universal vertical relationship.

The board 110, the linear bush 120, the pedestal 140, and the supporter 170 are an example of a fixed member. The board 110 is an example of a basal portion. The actuator 130 is an example of a vibrating element. The pressure sensor 150 is an example of a detection unit that detects a rotation operation performed on each of the frame 190, the knob 195A, and the cover 195C. The damper 155 is an example of a rubber member. The holder 160 and the base 180 is an example of a movable member. The frame 190, the knob 195A, and the cover 195C is an example of the operation unit. The electrostatic sensor 195B is an example of a touch sensor. In addition, a surface 195C1 of the cover 195C is an operation surface 100A of the input device 100.

The input device 100 is an input device that allows the frame 190 to be pressed to perform a rotation operation about the shaft 125 in the clockwise direction in a mode illustrated in FIG. 4. The position of the frame 190 illustrated in FIG. 4 is an initial position at which the rotation operation is not performed. The stroke of the rotation operation of the frame 190 is less than or equal to, as an example, 1 mm in a downward direction when measured at the location of a top end 190B of the frame 190, which is the farthest from an end portion 190A.

The input device 100 is connected to the control device 200 via a cable 201 (refer to FIG. 1). The control device 200 controls driving of the actuator 130, acquires the detection result of the pressure sensor 150, and acquires the detection result of the electrostatic sensor 195B.

The board 110 is, for example, a plate-shaped resin member. The board 110 has fixed on the +Z direction side surface 110A thereof, the linear bush 120, the fixed part 130A of the actuator 130, the pedestal 140, the pressure sensor 150, and the supporter 170.

The linear bush 120 has a built-in bearing inside an insertion hole 120A. The linear bush 120 is fixed to the surface 110A of the board 110 on the positive Y-axis direction side of the surface 110A. The linear bush 120 rotatably supports the shaft 125 in a movable manner in the axial direction of the shaft 125 with the shaft 125, which serves as a rotation shaft, inserted into and disposed in the insertion hole 120A. Although the shaft 125 is movable in the axial direction with respect to the insertion hole 120A of the linear bush 120, the shaft 125 does not rotate with respect to the insertion hole 120A.

Both ends of the shaft 125 are rotatably supported by a mounting portion 182 of the base 180, and the base 180 is rotatable about the shaft 125. Alternatively, the linear bush 120 may be configured to support the shaft 125 in a rotatable manner and in a linearly movable manner. In this case, when the mounting portion 182 of the base 180 rotatably supports the shaft 125, the shaft 125 and the base 180 may be made rotatable together.

The actuator 130 has two fixed parts 130A and two moving parts 130B each facing one of the two fixed parts 130A with a space therebetween. The fixed part 130A is an example of a stator, and the moving part 130B is an example of a movable element. The two fixed parts 130A are fixed to the surface 110A of the board 110 and are arranged in the X direction. The two moving parts 130B are fixed to a negative Z-axis direction side surface 160A of the holder 160 that faces the surface 110A of the board 110 and are arranged in the X direction.

As illustrated in FIGS. 7A and 7B, the fixed part 130A has a yoke 131A, yokes 132A, and coils 133A and 134A. The yoke 131A is a plate-shaped yoke, and the two yokes 132A protrude from an upper surface illustrated in FIG. 7B. The two coils 133A and 134A are disposed around the two yokes 132A, respectively.

The moving part 130B includes a yoke 131B and a magnet 132B. The yoke 131B is a plate-shaped yoke, and each of two ends illustrated in FIG. 7A is curved toward the yoke 131A (downward in FIG. 7A). As illustrated in FIG. 7A, the magnet 132B is a permanent magnet having an N pole in the lower half and an S pole in the upper half. Since the S pole of the magnet 132B is in contact with the yoke 131B, both ends of the yoke 131B serve as S poles.

When electric currents are passed through the two coils 133A and 134A in opposite directions, the moving part 130B receives a magnetic force that moves the moving parts 130B relative to the fixed part 130A in one direction along the X-axis direction. By periodically reversing the directions of the electric currents flowing in the two coils 133A and 134A, the moving part 130B can be vibrated relative to the fixed part 130A in the right-left direction along the X-axis direction.

More specifically, for example, when an electric current is passed through the coil 133A in a counterclockwise direction in plan view and, at the same time, an electric current is passed through the coil 134A in a clockwise direction in plan view, the upper part of the left yoke 132A acts as the N pole, and the upper side of the right yoke 132A acts as the S pole. Therefore, the N pole of the upper side of the left yoke 132A and the S pole on the left side of the yoke 131B are attracted to each other, and the S pole of the upper side of the right yoke 132A and the N pole on the lower side of the magnet 132B are attracted to each other. Thus, the moving part 130B moves to the right.

Furthermore, when an electric current is passed through the coil 133A in a clockwise direction in plan view and an electric current is passed through the coil 134A in a counterclockwise direction in plan view, the upper part of the left yoke 132A acts as the S pole, and the upper part of the right yoke 132A acts as the N pole. Therefore, the S pole of the upper part of the left yoke 132A and the N pole on the lower side of the magnet 132B are attracted to each other, and the N pole of the upper part of the right yoke 132A and the S pole on the right side of the yoke 131B are attracted to each other. Thus, the moving part 130B moves to the left.

In this manner, if the directions of the electric currents flowing in the two coils 133A and 134A in opposite directions are reversed at a predetermined frequency, the moving part 130B can be vibrated relative to the fixed part 130A in the right-left direction in FIG. 7A.

The pedestal 140 is fixed to the surface 110A of the board 110, on the −Y direction side of the actuator 130. The pedestal 140 is made of resin, for example. The fact that the pedestal 140 is located on the −Y direction side of the actuator 130 means that the pedestal 140 is disposed farther away from the shaft 125 than the actuator 130.

The pedestal 140 is a plate-shaped member, and two shafts 145A each inserted into one of two springs 145 are fixed to the pedestal 140. The spring 145 is disposed between the pedestal 140 and a pressing portion 163 of the holder 160 so as to be compressed from its natural length. The spring 145 urges the pressing portion 163 in the +Z direction. The holder 160 is fixed to the frame 190 via the base 180, and the spring 145 is provided to urge the frame 190 to the initial position.

The pressure sensor 150 includes a sensor unit 151 and a wiring unit 152. The sensor unit 151 has two electrodes separated from each other in the Z direction. The sensor unit 151 is disposed so as to be sandwiched between the lower surface of the damper 155 and the surface 160A of the holder 160. The wiring unit 152 is a wiring unit connected to the sensor unit 151. The wiring unit 152 extends from the upper surface of the pedestal 140 to the lower surface of the board 110. That is, the pressure sensor 150 is disposed so as to be farther away from the shaft 125 than the actuator 130.

If the output value of the pressure sensor 150 is greater than or equal to a predetermined threshold value, the control device 200 connected to the input device 100 determines that a user presses the operation surface 100A of the input device 100 to perform a rotation operation. By using the pressure sensor 150 in this way, the rotation operation performed on the operation surface 100A of the input device 100 can be easily and accurately detected. Determination made by the control device 200 as to whether the rotation operation has been performed is the same as the detection of a rotation operation by the control device 200. Upon detecting a rotation operation, the control device 200 drives the actuator 130 to provide vibration to the operation surface 100A in order to provide haptic feedback to the user that the operation performed by the user has been confirmed.

The damper 155 is a lump of rubber and is an example of an elastic member. The damper 155 is provided so as to be sandwiched between the sensor unit 151 of the pressure sensor 150 and the pressing portion 163 of the holder 160.

The holder 160 has a main body portion 161, extending portions 162, and the pressing portion 163. The holder 160 is made of resin, for example. The main body portion 161 is a rectangular plate-shaped member having a longitudinal direction in the X direction in plan view and having the surface 160A on the −Z direction side. The moving part 130B of the actuator 130 is fixed to the surface 160A. Furthermore, the position of the holder 160 in the Y direction is determined so that the moving part 130B of the actuator 130 fixed to the surface 160A faces the fixed part 130A of the actuator 130.

The extending portions 162 are two plate-shaped members extending from the main body portion 161 in the +Y direction. The extending portion 162 is offset from the main body portion 161 in the +Z direction to form a step. The extending portion 162 includes a mounting portion 162A and a screw hole 162B. The mounting portion 162A is located at the end of the extending portion 162 in the +Y direction and is formed so as to be inclined relative to the XY plane at an angle corresponding to the angle of the frame 190 relative to the holder 160. The base 180 is screwed to the mounting portion 162A with screws 164. The holder 160 and the base 180 are fixed to each other by screwing the base 180 to the mounting portion 162A.

The pressing portion 163 is a plate-shaped member protruding in the −Y direction from the center of the width of the main body portion 161 in the X direction. The width of the pressing portion 163 in the X direction is less than the width of the main body portion 161 in the X direction. The pressing portion 163 has two protruding portions 163A at either end in the X direction of the surface on the −Z direction side. The damper 155 is in contact with a circle 163B drawn with a broken line at the center of the −Z direction side surface of the pressing portion 163, and the springs 145 are in contact with two circles 163C at either end in the X direction of an end portion in the negative Y-axis direction of the positive Z direction side surface of the pressing portion 163.

The supporters 170 are two L-shaped members in XZ plane view and are fixed to the surface 110A of the board 110. The supporters 170 are made of resin, for example. The two supporters 170 are disposed so that the top end portions 170A bent in the X direction face each other. The top end portion 170A overlaps the pressing portion 163 of the holder 160 in plan view. The pressing portion 163 urged in the +Z direction by the spring 145 is in contact with the top end portion 170A of the supporter 170 when the operation surface 100A is not subjected to a rotation operation. That is, when the operation surface 100A and the frame 190 supporting the operation surface 100A are in their initial positions, the pressing portion 163 is in contact with the top end portion 170A. That is, the supporter 170 is provided to position the frame 190 at the initial position when the rotation operation is not subjected to a rotation operation.

Figure 9:
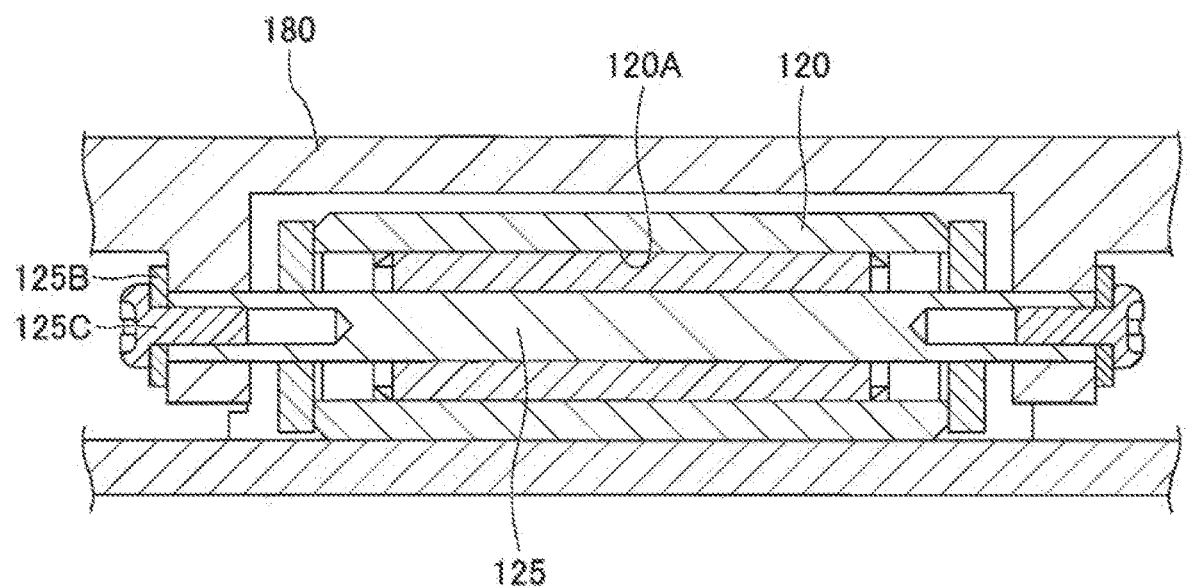
FIG. 9 is a cross-sectional view of a mounting structure for mounting the base on a shaft.

The base 180 has a main body portion 181 and two mounting portions 182. The base 180 is made of resin, for example. The main body portion 181 is a plate-shaped member having the longitudinal direction in the X direction, and the two mounting portions 182 protrude in the −Z direction from the −Z direction side surface of the main body portion 181. The mounting portion 182 has a through-hole 182A penetrating in the X direction, and the shaft 125 is inserted into the through-hole 182A. Note that in the description of the base 180, FIG. 9 is used in addition to FIG. 1 to FIG. 7B. FIG. 9 is a cross-sectional view of a mounting structure for mounting the base 180 on the shaft 125.

To rotatably attach the base 180 to the shaft 125, the shaft 125 inserted into the insertion hole 120A of the linear bush 120 is inserted into the through-hole 182A of the mounting portions 182, and screws 125C are screwed into the screw holes 125A at either end of the shaft 125 via washers 125B. The shaft 125 is attached so as to be movable in the axial direction relative to the insertion hole 120A of the linear bush 120. However, the shaft 125 does not rotate relative to the insertion hole 120A.

The base 180 is rotatably supported by the shaft 125 by inserting the shaft 125 into the through-holes 182A of the two mounting portions 182 (refer to FIG. 6) and screwing the screws 125C to the shaft 125 via the washers 125B. The base 180 does not move in the X direction (the axial direction of the shaft 125) relative to the shaft 125 but is rotatable relative to the shaft 125. The shaft 125 is movable in the X direction (the axial direction of the shaft 125) relative to the linear bush 120. Thus, when the actuator 130 is driven, the holder 160, the base 180, and the frame 190 held by the board 110 via the shaft 125 vibrate in the X direction. The vibration in the X direction is the vibration along the surface 195C1 of the cover 195C. To directly transmit, to the shaft 125, the operation (the vibration) of the actuator 130 during driving of the actuator 130, both the ends of the shaft 125 are fixed to the base 180 in the X direction (the axial direction of the shaft 125).

Furthermore, a fixed portion 181A is provided at both ends of the main body portion 181 in the X direction to fix both ends in the X-axis direction of an end portion in the −Z direction of the frame 190 which is formed in a U shape having an open end in the −Z direction. The fixed portion 181A is formed in a U shape having an open end in the +Z direction so as to sandwich both ends of the frame 190 along the Y direction when the frame 190 is fixed.

The frame 190 is a U-shaped member having an open end in the −Z direction. The frame 190 is made of resin, for example. The frame 190 has the flat plate-shaped end portions 190A that are formed so as to protrude, in the −Z direction, from either end in the X direction of the flat plate-shaped top end 190B on the +Z direction side. Each of the end portions 190A is screwed to the fixed portion 181A of the base 180 by a screw 191. For this reason, the end portion 190A is a fixed end of the frame 190, which is a cantilevered member. In addition, the top end 190B is a free end of the frame 190, which is a cantilever member. The end portion 190A is an example of one end of the frame 190. The frame 190 may be integrated with the knob 195A. However, a separate form of the frame 190 is described below.

The frame 190 is fixed to the holder 160 via the base 180 and is rotatable between the position at which the +Z direction side surface of the pressing portion 163 is in contact with the supporter 170 (the initial position) and a position at which the pressing portion 163 of the holder 160 crushes the damper 155 (the full stroke position). That is, when the rotation operation is performed on the operation surface 100A, the frame 190, the base 180, and the holder 160 rotate together. Note that at the full stroke position, the protruding portion 163A of the pressing portion 163 is not in contact with the pedestal 140.

The frame 190 is rotatably attached to the shaft 125 via the base 180. In addition, the side of the frame 190 to which the knob 195A, the electrostatic sensor 195B, and the cover 195C are mounted functions as a mounting portion 190C on which the knob 195A, the electrostatic sensor 195B, and the cover 195C are mounted.

The frame 190, the base 180, and the holder 160 are fixed so as to make an angle with each other when viewed in the axial direction of the shaft 125 (the X direction). As illustrated in FIG. 4, the frame 190, the base 180, and the holder 160 constitute a lever, in which the shaft 125 acts as a fulcrum, a point at which the load of the rotation operation is applied to the frame 190 acts as the point of effect, and the pressing portion 163 of the holder 160 that presses the damper 155 acts as the point of load.

A rotation operation to rotate the frame 190 from the upper side to the lower side in FIG. 4 is performed via the operation surface 100A. The knob 195A, the electrostatic sensor 195B, and the cover 195C are stacked in this order and are mounted in the upper section of the frame 190 in FIG. 4.

The knob 195A is a plate-shaped member to be attached to the frame 190. The knob 195A is made of resin, for example. A rotation operation is performed on the knob 195A by the user's hand or the like. In the knob 195A attached to the frame 190, the positional relationship between the free end and the fixed end is the same as in the frame 190. That is, the end portion in the +Z direction is the free end, and the end portion in the −Z direction is the fixed end.

The electrostatic sensor 195B is provided on top of the knob 195A and is disposed between the knob 195A and the cover 195C. The electrostatic sensor 195B is provided to detect a position at which the user's hand or the like touches the cover 195C (a touch position). The position at which the user's hand or the like touches the cover 195C is the position at which the rotation operation is performed on the surface 195C1 of the cover 195C.

The electrostatic sensor 195B has a substantially rectangular shape and includes a plurality of electrodes arranged in the direction of a first axis 195B1 and in the direction of a second axis 195B2. The plurality of electrodes are electrodes each detecting the position by the value of capacitance. The plurality of electrodes arranged in the direction of the first axis 195B1 and the plurality of electrodes arranged in the direction of the second axis 195B2 are spaced apart from each other. The electrostatic sensor 195B outputs the value of the capacitance at an intersection of the electrodes.

For example, the surface 195C1 of the cover 195C is divided into a plurality of regions, and a predetermined function is assigned to each of the regions. In this case, it is determined on which region of the surface 195C1 the rotation operation is performed. In this manner, the electrostatic sensor 195B is used to identify the function selected by the user.

The cover 195C is fixed on top of the electrostatic sensor 195B. The cover 195C is made of resin, for example. The surface 195C1 of the cover 195C is the operation surface 100A on which the rotation operation is performed by the user.

Note that due to the above-described configuration, the frame 190, the knob 195A, and the cover 195C, which are an example of the operation unit, can rotate about one end thereof that is close to the shaft 125 and that serves as a rotation center.

As illustrated in FIG. 8, the control device 200 is connected to the actuator 130, the pressure sensor 150, and the electrostatic sensor 195B via a bus or the like. In addition, the control device 200 is connected to an ECU (Electronic Control Unit) of a vehicle, for example.

The control device 200 detects a position (a touch position) at which the fingertip touches the surface 195C1 of the cover 195C on the basis of the output of the electrostatic sensor 195B and identifies, for example, a function in accordance with the detected position. The control device 200 outputs a signal representing the identified function to the ECU of the vehicle.

Upon detecting a rotation operation on the basis of the output of the pressure sensor 150, the control device 200 drives the actuator 130 and outputs a signal indicating that the operation corresponding to the identified function is determined to the ECU of the vehicle. As a result, the acceptance of the rotation operation is fed back to the user who touches the cover 195C through haptic feedback. In addition, the ECU of the vehicle performs the identified function on the basis of the signal input from the control device 200.

After a rotation operation is performed on the cover 195C serving as the operation surface 100A of the input device 100 by the user and the control device 200 detects the rotation operation on the basis of the output of the pressure sensor 150, the control device 200 drives the actuator 130. The actuator 130 provides vibration to the cover 195C, which is the operation surface 100A. That is, the actuator 130 is driven to provide, to the user who touches the cover 195C, information indicating that the rotation operation has been accepted through haptic feedback. Then, the function identified on the basis of the touch position is performed by the ECU of the vehicle.

Then, the moving part 130B fixed to the holder 160 vibrates in the X direction with respect to the fixed part 130A fixed to the board 110 and, thus, the actuator 130 vibrates in the X direction. The holder 160 is fixed to the frame 190 via the base 180, and the knob 195A, the electrostatic sensor 195B, and the cover 195C are fixed to the frame 190. In addition, since the base 180 rotatably supports the shaft 125 that is supported by the linear bush 120 in a linearly movable manner, the base 180 vibrates in the axial direction of the shaft 125 (the X direction) together with the moving part 130B of the actuator 130 when the actuator 130 is driven. As a result, when the moving part 130B of the actuator 130 vibrates in the X direction, the holder 160, the base 180, the frame 190, and the like also vibrate together.

Thus, the actuator 130 vibrates the surface 195C1 of the cover 195C in the X direction. Since the surface C1 of the cover 195C extends in the X direction, which is the direction in which the moving part 130B of the actuator 130 vibrates, vibration occurs on the surface C1 of the cover 195C along the surface 195C1 when the actuator 130 is driven.

Therefore, the input device 100 can be provided that vibrates in a direction along the surface 195C1 of the cantilevered cover 195C.

Furthermore, the amplitude and intensity of the vibration along the surface 195C1 are uniform all over the surface 195C1. This is because unlike existing actuators that vibrate and displace the free end in the vertical direction using the fixed end as a fulcrum, vibration is not amplified at the free end.

In this manner, the input device 100 that vibrates uniformly all over the surface 195C1 of the cover 195C can be provided. This is because vibration with uniform intensity and amplitude can be obtained in the region of the cover 195C close to the rotation shaft (the shaft 125) and in the top end region. Such uniform vibration is easily perceived by a sensory organ, such as the human hand. Thus, vibration that is easy for a user to perceive is generated. In addition, the vibration at operation position does not vary from position to position. As a result, the input device 100 can be provided that does not generate unnaturalness that the user feels with the operation performed by the user.

Furthermore, when the input device 100 is fixed to a moving object, such as a vehicle, the input device 100 receives vibration in the vertical direction as the moving object travels. For this reason, if the input device 100 is fixed to a moving object, such as a vehicle, such that the surface 195C1 is substantially horizontal, the direction of the vertical vibration caused by the traveling of the moving object differs from the direction of vibration generated on the surface 195C1. Thus, the vibration along the surface 195C1 is less likely to be influenced by the vibration in the vertical direction caused by the traveling. As a result, the user can easily detect the vibration generated on the surface 195C1 caused by the vibration of the actuator 130.

Furthermore, the actuator 130 is provided between the board 110 and the holder 160 disposed on top of the board 110. Thus, the actuator 130 is not disposed adjacent to the frame 190 on which a rotation operation is performed. For this reason, the input device 100 having excellent designability can be provided. In addition, if the actuator 130 is mounted on the side adjacent to the frame 190, it is difficult to increase the intensity of vibration because the mounting area is limited. However, when the actuator 130 is disposed on the side adjacent to the board 110, the mounting area does not depend on the size of the frame 190 and, thus, the actuator 130 having a large size can be installed, which can easily increase the intensity of vibration.

Furthermore, in the input device 100, the operation unit (the frame 190, knob 195A, and cover 195C), the rotating shaft (the shaft 125), the vibrating element (the actuator 130), and the detection unit (the pressure sensor 150) are disposed in this order from the side with the top end 190B of the frame 190 to the side with the −Y direction side end portion of the board 110. Thus, the rotation operation performed on the operation unit (the frame 190, knob 195A, and cover 195C) can be transmitted toward the holder 160 via the rotation shaft (the shaft 125) and can be detected by the pressure sensor 150 using the principle of leverage. By placing the detection unit (the pressure sensor 150) farther away from the rotation shaft (the shaft 125) than the vibrating element (the actuator 130), the rotation operation can be easily detected. Note that the arrangement of the units is not limited to the above-mentioned arrangement as long as the rotation operation can be easily detected.

Furthermore, in the input device 100, the fixed part 130A of the actuator 130 is fixed to the board 110, and the moving part 130B is fixed to the holder 160. For this reason, vibration can be efficiently generated between the fixed member (the board 110, linear bush 120, pedestal 140, and supporter 170) and the movable member (the holder 160 and base 180).

The above description has been made with reference to the configuration in which the threshold value used by the control device 200 to detect a rotation operation on the basis of the output of the pressure sensor 150 is a constant value regardless of the position at which the rotation operation is performed on the surface 195C1 of the cover 195C. However, a configuration described below may be employed.

Figure 10:
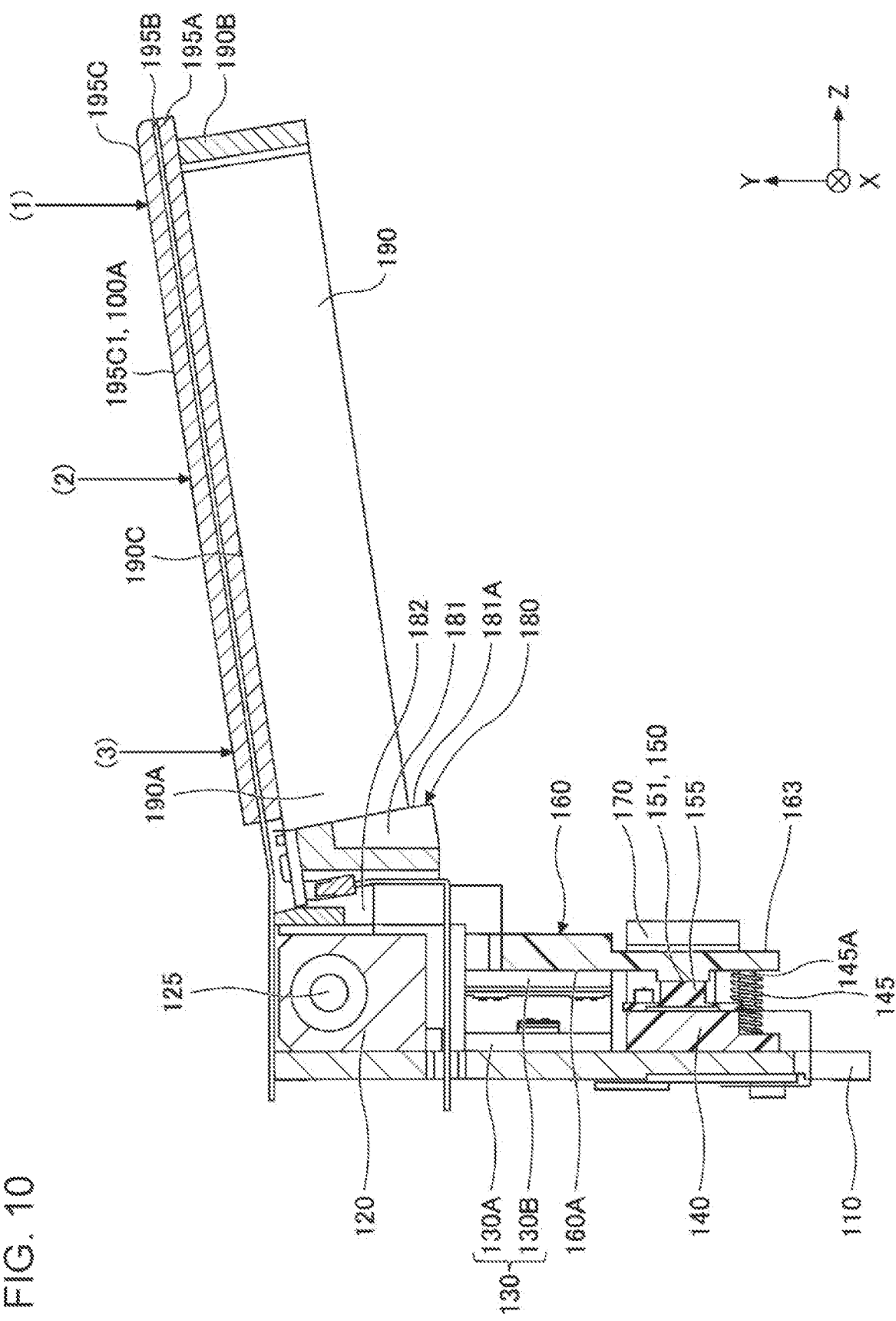
FIG. 10 is a diagram illustrating positions (1), (2), and (3) in the cross section taken along the line X-X of FIG. 1.

FIG. 10 is a cross-sectional view taken along a line X-X of FIG. 1 to denote positions (1), (2), and (3). FIG. 10 is similar to FIG. 4. However, FIG. 10 denotes the positions (1), (2), and (3) on the surface 195C1 of the cover 195C. The positions (1), (2), and (3) have different distances from the shaft 125.

For example, in the case where the threshold value used by the control device 200 to detect a rotation operation on the basis of the output of the pressure sensor 150 is a constant value, when the user pushes down the positions (1), (2), and (3) on the surface 195C1 of the cover 195C illustrated in FIG. 10 with the fingertip to perform a rotation operation, the magnitude of the force (the operation load) required for the rotation operation duffer due to the principle of leverage. The shaft 125 acts as the fulcrum, each of the positions (1), (2), and (3) acts as the point of effect, and the point at which the damper 155 of the pressing portion 163 of the holder 160 is pressed acts as the point of load. Consequently, when the user pushes down the position (1), the force required to satisfy the threshold value of the pressure applied to the pressure sensor 150 is minimized. When the user pushes down the position (3), the force required to satisfy the threshold value of the pressure applied to the pressure sensor 150 is maximized.

To equalize the difference in the magnitude of the force required for the rotation operation, the control device 200 can change the threshold value used to determine whether a rotation operation has been performed on the basis of the output of the pressure sensor 150, in accordance with the distance of the position detected by the electrostatic sensor 195B from the shaft 125, for example. For example, the surface 195C1 of the cover 195C is divided into three areas in accordance with the distance from the shaft 125, the threshold value used when the rotation operation is performed in the area closest to the shaft 125 is minimized, and the threshold value used when the rotation operation is performed in the area farthest from the shaft 125 is maximized. In this manner, the operation load of the rotation operation required for the control device 200 to determine whether the rotation operation has been performed can be equalized regardless of the distance from the shaft 125.

Alternatively, instead of making the threshold value used by the control device 200 to detect the rotation operation variable, a configuration may be employed that includes a plurality of sets of the pressure sensor 150 and the damper 155.

Figure 11:
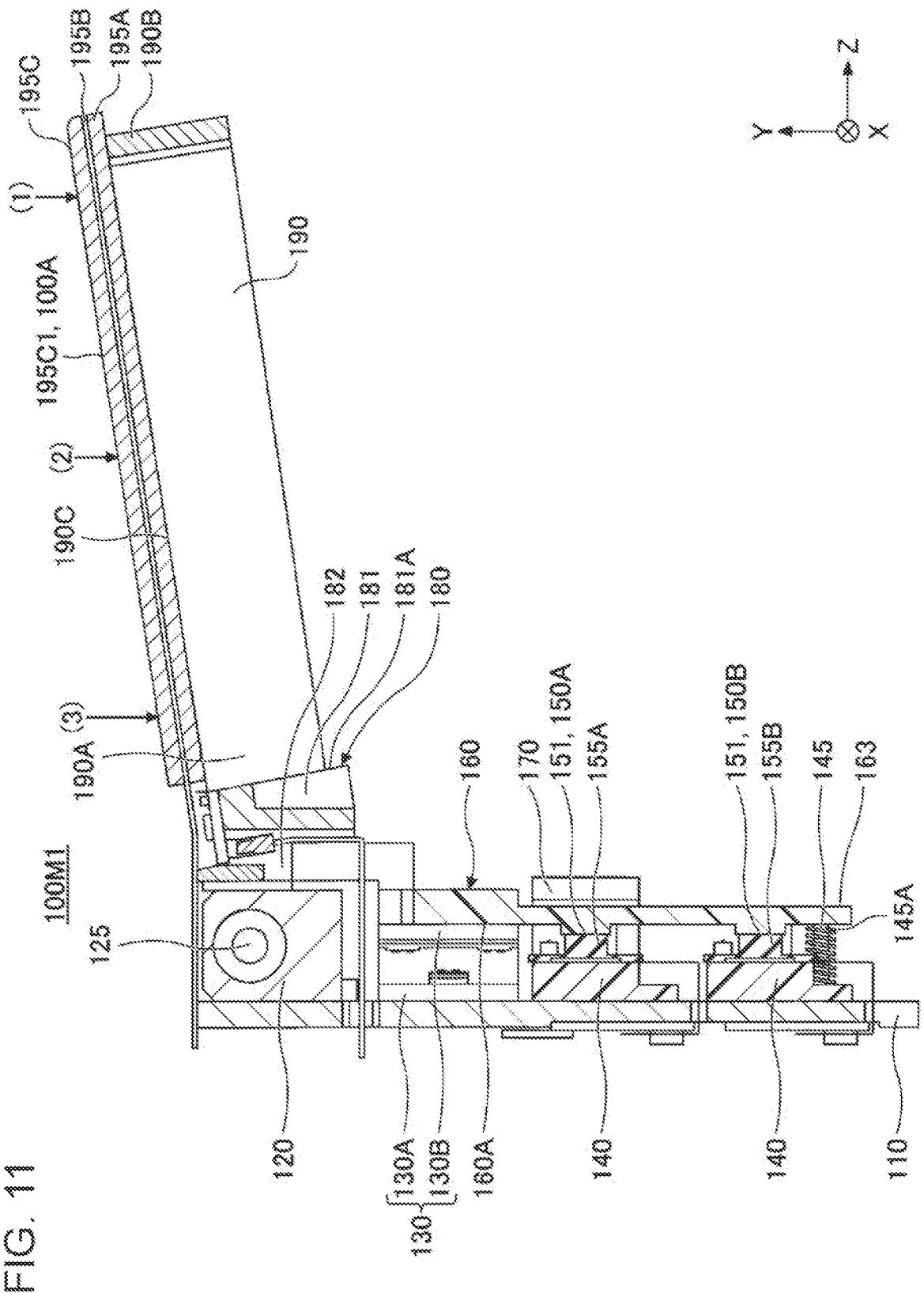
FIG. 11 illustrates an input device according to a first modification of the embodiment.
Figure 12:
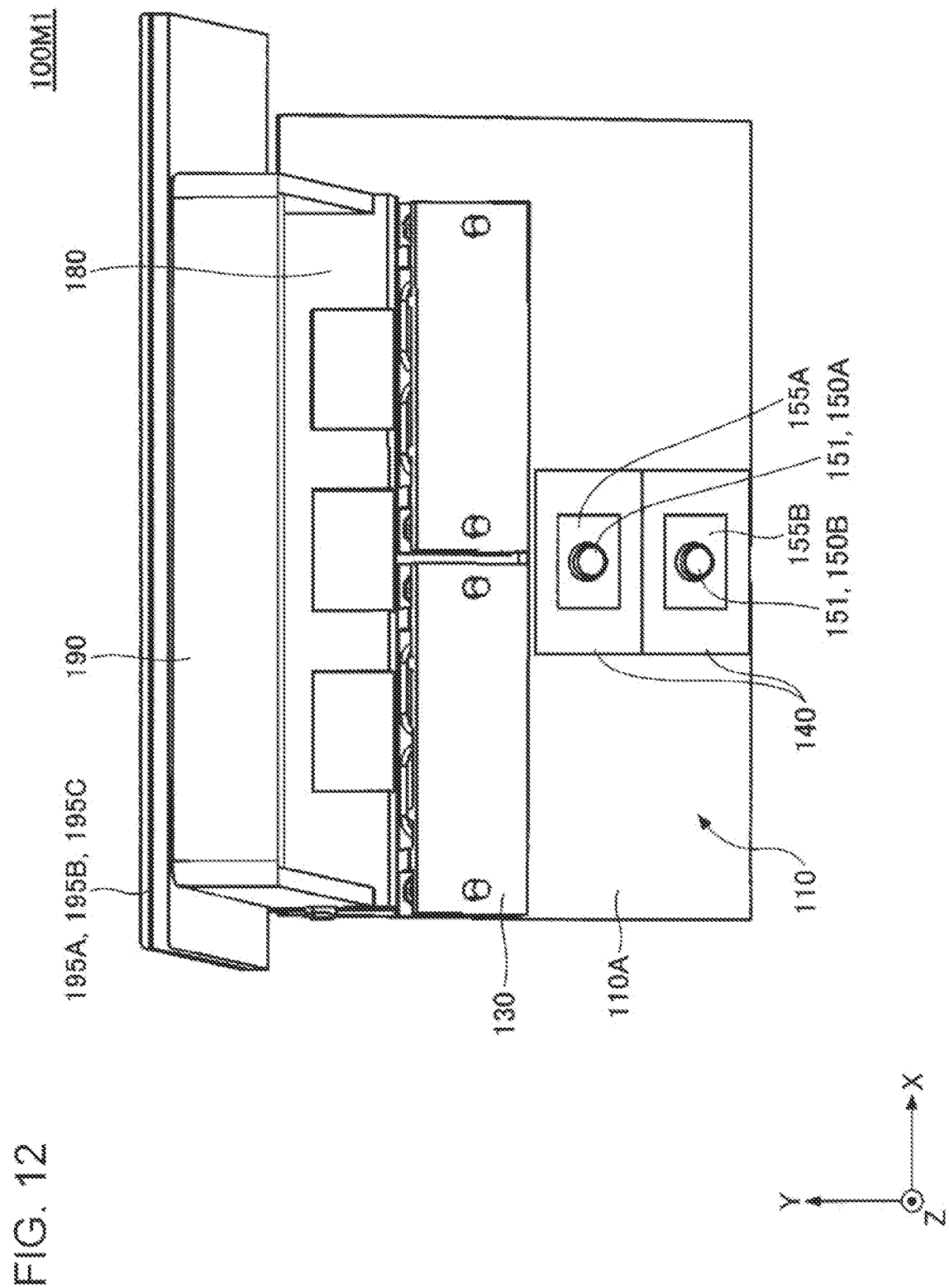
FIG. 12 illustrates the input device according to the first modification of the embodiment.

FIGS. 11 and 12 illustrate an input device 100M1 according to a first modification of the embodiment. FIG. 11 illustrates a cross section corresponding to FIG. 4. FIG. 12 is a view of the input device 100M1 as viewed in the +Z direction. FIG. 12 illustrates the input device 100M1 with the holder 160 removed so that the pressure sensor 150 can be seen.

Unlike the input device 100 illustrated in FIGS. 1 to 6, the input device 100M1 includes two pedestals 140, two pressure sensors 150A and 150B, and two dampers 155A and 155B. In addition, this configuration increases the size of the pressing portion 163 of the holder 160.

The two pressure sensors 150A and 150B are provided between the upper surface of the damper 155A and the lower surface of the pressing portion 163 of the holder 160 and between the upper surface of the damper 155B and the lower surface of the pressing portion 163, respectively. As illustrated in FIG. 11, the two pressure sensors 150A and 150B and the two dampers 155A and 155B are arranged in the Y direction and are fixed to the surface 110A of the board 110. Note that the input device 100M1 does not perform position detection using the electrostatic sensor 195B.

Figure 13:
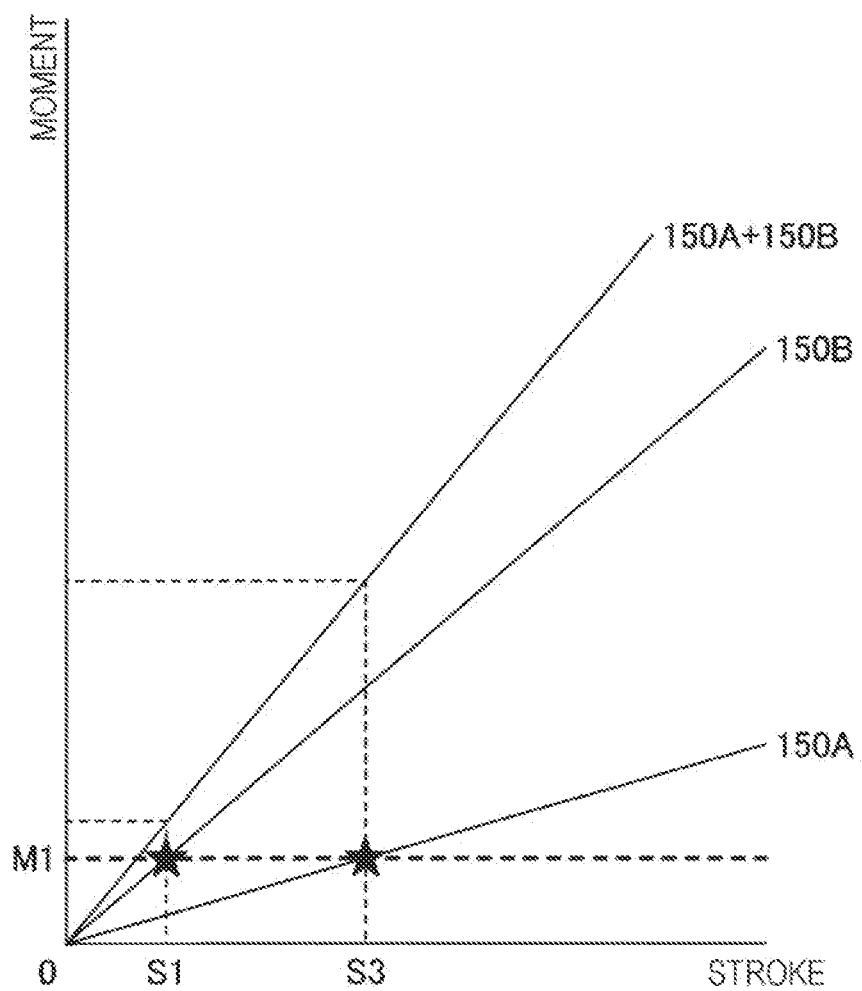
FIG. 13 illustrates the relationship between the stroke and the moment in the input device.

FIG. 13 illustrates the relationship between the stroke and the moment (which is the same as the pressure applied to the pressure sensor 150) in the input device 100M1. Hereinafter, description is made under the condition that the control device 200 illustrated in FIG. 1 is connected to the input device 100M1 illustrated in FIGS. 11 and 12.

Furthermore, a rotation operation is performed at the position (1) or the position (3) illustrated in FIG. 11. However, since the input device 100M1 does not perform the position detection using the electrostatic sensor 195B, the input device 100M1 cannot detect at which position a rotation operation has been performed from the output of the electrostatic sensor 195B.

The configurations of the pressure sensors 150A and 150B are the same, which are the same as the configuration of the pressure sensor 150 described above. In addition, the threshold values used when the control device 200 detects a rotation operation on the basis of the outputs of the pressure sensors 150A and 150B are the same.

In the input device 100M1, the spring constant of the +Y direction side damper 155A close to the shaft 125 and the spring constant of the −Y direction side damper 155B remote from the shaft 125 are controlled so that the threshold values of the moments are the same which are used when the control device 200 detects a rotation operation on the basis of the outputs of the two pressure sensors 150A and 150B located at different distances from the shaft 125.

More specifically, for example, the spring constant of the +Y direction side damper 155A close to the shaft 125 is set to a value less than the spring constant of the −Y direction side damper 155B remote from the shaft 125. In this manner, the threshold values of the moments are made the same which are used when the control device 200 detects a rotation operation on the basis of the outputs of the two pressure sensors 150A and 150B located at different positions from the shaft 125.

Since the moments in accordance with the distances from the shaft 125 act on the pressure sensors 150A and 150B, the characteristics of the moments with respect to the stroke differ from each other due to the difference in the distance from the shaft 125. However, the setting is made by controlling the spring constants of the damper 155A and the damper 155B so that when a moment M1 acts on the pressure sensors 150A and 150B, the control device 200 detects a rotation operation on the basis of the outputs of the pressure sensors 150A and 150B.

The stroke on the abscissa in FIG. 13 represents a stroke when the user presses some position on the surface 195C1 of the cover 195C to perform a rotation operation. The moment on the ordinate represents the moment received by the pressure sensors 150A and/or 150B due to the rotation operation. The moments received by the pressure sensors 150A and 150B due to the rotation operation are balanced with the moments due to the reaction forces of the dampers 155A and 155B, respectively.

When the user presses the surface 195C1 of the cover 195C, which is the operation surface 100A, at some position to perform a rotation operation, the cover 195C is rotated and the holder 160 is also rotated. The moment on the ordinate in FIG. 13 represents the outputs of the pressure sensor 150A and the pressure sensor 150B when the pressure sensor 150A and the pressure sensor 150B are pressed by the holder 160 which is rotated together with the cover 195C due to the rotation operation performed on the cover 195C.

The three characteristic lines illustrated in FIG. 13 represent the characteristics of the moment received by the pressure sensor 150A with respect to the stroke, the characteristics of the moment received by the pressure sensor 150B with respect to the stroke, and the characteristics of the sum of the moment received by the pressure sensor 150A and the moment received by the pressure sensor 150B with respect to the stroke. The sum of the moments received by the pressure sensors 150A and 150B is the moment applied to the surface 195C1 of the cover 195C due to the rotation operation performed by the user.

That is, the three characteristics illustrated in FIG. 13 represent the output of the pressure sensor 150A, the output of the pressure sensor 150B, and the sum of the outputs of the pressure sensors 150A and 150B. The control device 200 detects that the rotation operation has been performed at the position (1) or the position (3) on the basis of the outputs of the pressure sensors 150A and 150B. The moments received by the pressure sensors 150A and 150B differ in accordance with the distances from the shaft 125. However, the setting is made by controlling the spring constants of the dampers 155A and 155B so that the threshold values of the moments used by the control device 200 to detect the rotation operation are the same.

If the control device 200 detects a rotation operation only by the output of the pressure sensor 150B, the control device 200 determines that the rotation operation has been performed at the position (3). Alternatively, if the control device 200 detects a rotation operation by the output of the pressure sensor 150B and then further detects a rotation operation by the output of the pressure sensor 150A, the control device 200 determines that the rotation operation has been performed at the position (1). Note that the information indicating that the rotation operation detected by only the output of the pressure sensor 150B represents the rotation operation performed at the position (3) and the information indicating that the rotation operation detected by the output of the pressure sensor 150A after a rotation operation is detected by the output of the pressure sensor 150B represents the rotation operation performed at the position (1) can be stored in an internal memory of the control device 200.

When the surface 195C1 of the cover 195C is pressed and the stroke reaches S1, the moment received by the pressure sensor 150B reaches M1. At this time, since the moment received by the pressure sensor 150A is about ⅓ of M1, the control device 200 detects that the rotation operation is performed at the position (3).

In addition, when the surface 195C1 of the cover 195C is further pressed and the stroke reaches S3, the moment received by the pressure sensor 150B reaches about three times M1, and the moment received by the pressure sensor 150A reaches M1. Thus, the control device 200 detects that the rotation operation is performed at the position (1). That is, the position at which the rotation operation has been performed can be estimated by compositely detecting the status of the moment received by each of the pressure sensors 150A and 150B.

The configuration has been described above with reference to use of two pressure sensors 150A and 150B having different distances from the shaft 125. However, if three or more pressure sensors 150 having different distances from the shaft 125 are used, it is possible to detect at which of three or more positions on the surface 195C1 of the cover 195C having different distances from the shaft 125 the rotation operation has been performed.

As described above, the input device 100M1 can detect which of a plurality of positions that are on the surface 195C1 of the cover 195C and that have different distances from the shaft 125 the rotation operation has been performed, without using the position detection by the electrostatic sensor 195B.

Therefore, according to the first modification of the embodiment, the input device 100M1 can be provided capable of vibrating in a direction along the surface 195C1 of the cover 195C and detecting at which of a plurality of positions that are on the surface 195C1 of the cover 195C and that have different distances from the shaft 125 a rotation operation has been performed.

Note that such control of the spring constants of the dampers 155A and 155B can be performed by changing the hardness, shape, material, and the like of the rubber lumps in the dampers 155A and 155B. By increasing the hardness, the spring constant can be increased. In addition, in terms of the shape, the spring constant can be increased by increasing the thickness. In terms of the material, the spring constant can be increased by using a hard material.

Furthermore, the configuration of one of the input devices 100M2 to 100M5 illustrated in FIGS. 14 to 17, respectively, may be employed. FIGS. 14 to 17 illustrate the input devices 100M2 to 100M5 of a second modification to the fifth modification of the embodiment, respectively.

Figure 14:
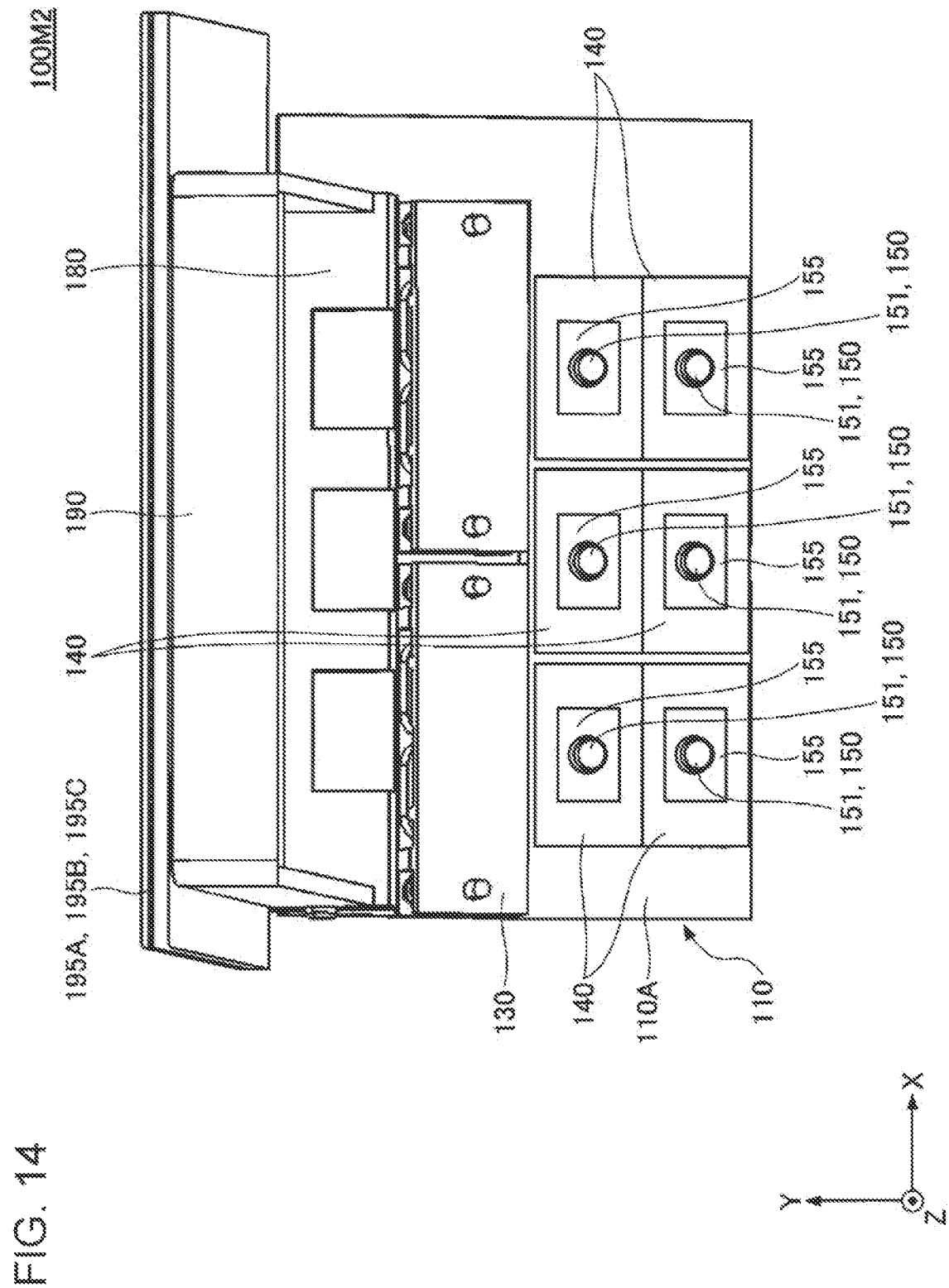
FIG. 14 illustrates an input device according to a second modification of the embodiment.

The input device 100M2 illustrated in FIG. 14 includes six sets of the pressure sensor 150 and the damper 155, and the six sets of the pressure sensor 150 and the damper 155 are arranged in a matrix, three in the X direction and two in the Y direction.

As described above, in the input device 100M2 including the six sets of the pressure sensor 150 and the damper 155, the two pressure sensors 150 are arranged in the Y direction so as to have different distances from the shaft 125. Thus, like the input device 100M1 according to the first modification, the input device 100M2 can detect which of the two positions that are on the surface 195C1 of the cover 195C and that have different distances from the shaft 125 a rotation operation has been performed, without using the position detection by the electrostatic sensor 195B.

In addition, the cover 195C may be deformed or bent in the X direction when a rotation operation is performed. In this case, the position on the surface 195C1 of the cover 195C at which the rotation operation has been performed can be detected on the basis of the outputs of a total of six pressure sensors 150 (two in the Y direction and three in the X direction). The outputs of the six pressure sensors 150 have different output characteristics in accordance with the planar distribution of the rigidity of each of the frame 190, the knob 195A, the electrostatic sensor 195B, and the cover 195C and the distances from the shaft 125. Thus, like the first modification, it can be detected in which one of six regions obtained by dividing the surface 195C1 of the cover 195C into three in X direction and two in Y direction the rotation operation has been performed on the basis of the number of operations for detecting the rotation operations based on the outputs of the six pressure sensors 150 and the arrangement pattern of the pressure sensors 150 used to detect the rotation operations.

Figure 15:
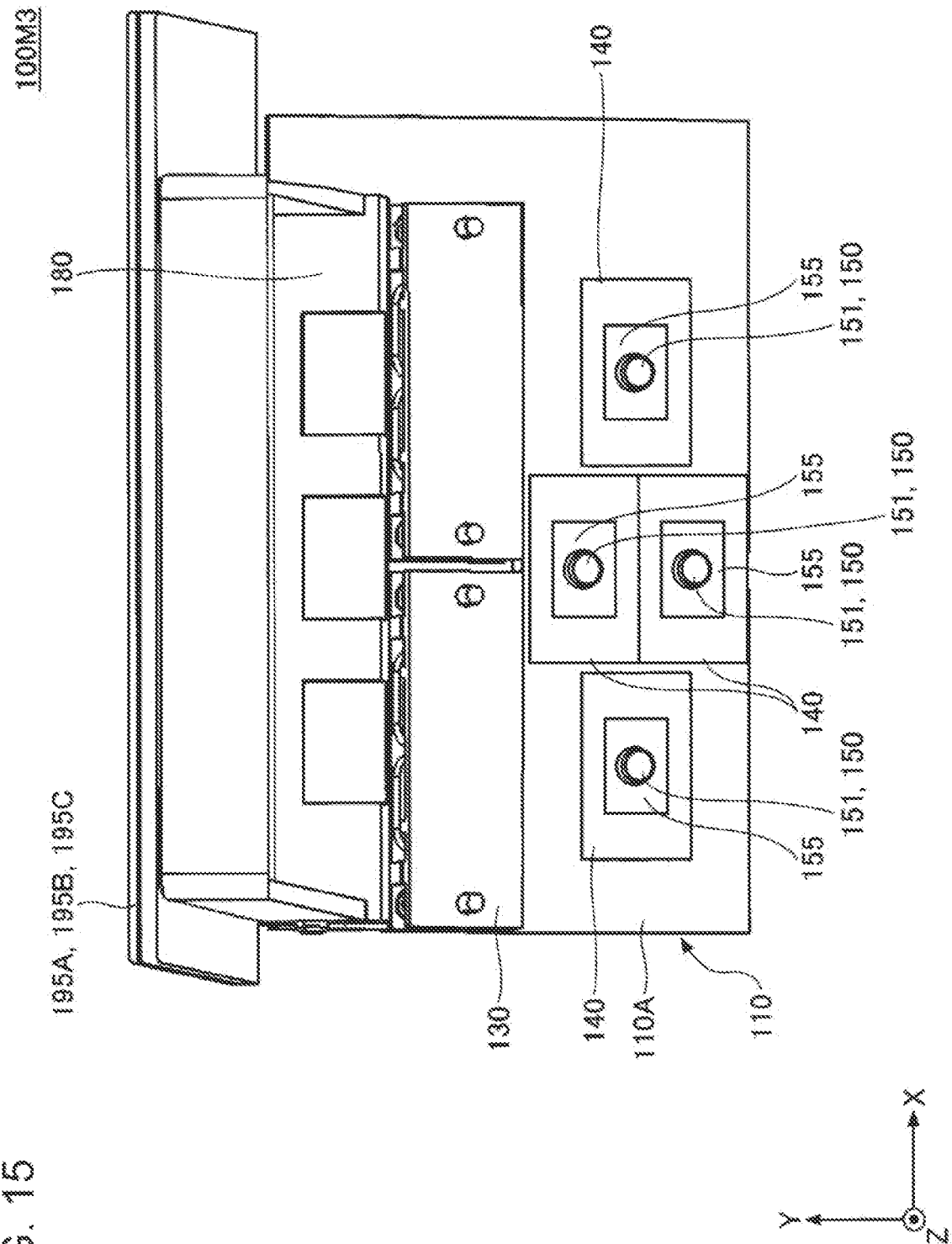
FIG. 15 illustrates an input device according to a third modification of the embodiment.

An input device 100M3 according to a third modification illustrated in FIG. 15 includes four sets of the pressure sensor 150 and the damper 155, and the four sets of the pressure sensor 150 and the damper 155 are disposed to form a cross shape, two in the X direction and two in the Y direction.

As described above, in the input device 100M3 including the four sets of the pressure sensor 150 and the damper 155, the pressure sensors 150 are arranged at three positions in the Y direction having different distances from the shaft 125. For this reason, by using a technique the same as in the input device 100M1 according to the first modification, the input device 100M3 can detect which of the three positions that are on the surface 195C1 of the cover 195C and that have different distances from the shaft 125 the rotation operation has been performed, without using the position detection by the electrostatic sensor 195B.

In addition, the cover 195C may be deformed or bent in the X direction when the rotation operation is performed. In this case, the position on the surface 195C1 of the cover 195C at which the rotation operation has been performed can be detected on the basis of the outputs of a total of four pressure sensors 150 (two in the Y direction and two in the X direction). The outputs of the four pressure sensors 150 have different output characteristics in accordance with the planar distribution of the rigidity of each of the frame 190, the knob 195A, the electrostatic sensor 195B, and the cover 195C, and the distances from the shaft 125. Thus, like the first modification, it can be detected in which one of regions obtained by dividing the surface 195C1 of the cover 195C into three in X direction and three in Y direction the rotation operation has been performed on the basis of the number of operations for detecting the rotation operations based on the outputs of the four pressure sensors 150 and the arrangement pattern of the pressure sensors 150 used to detect the rotation operations.

Figure 16:
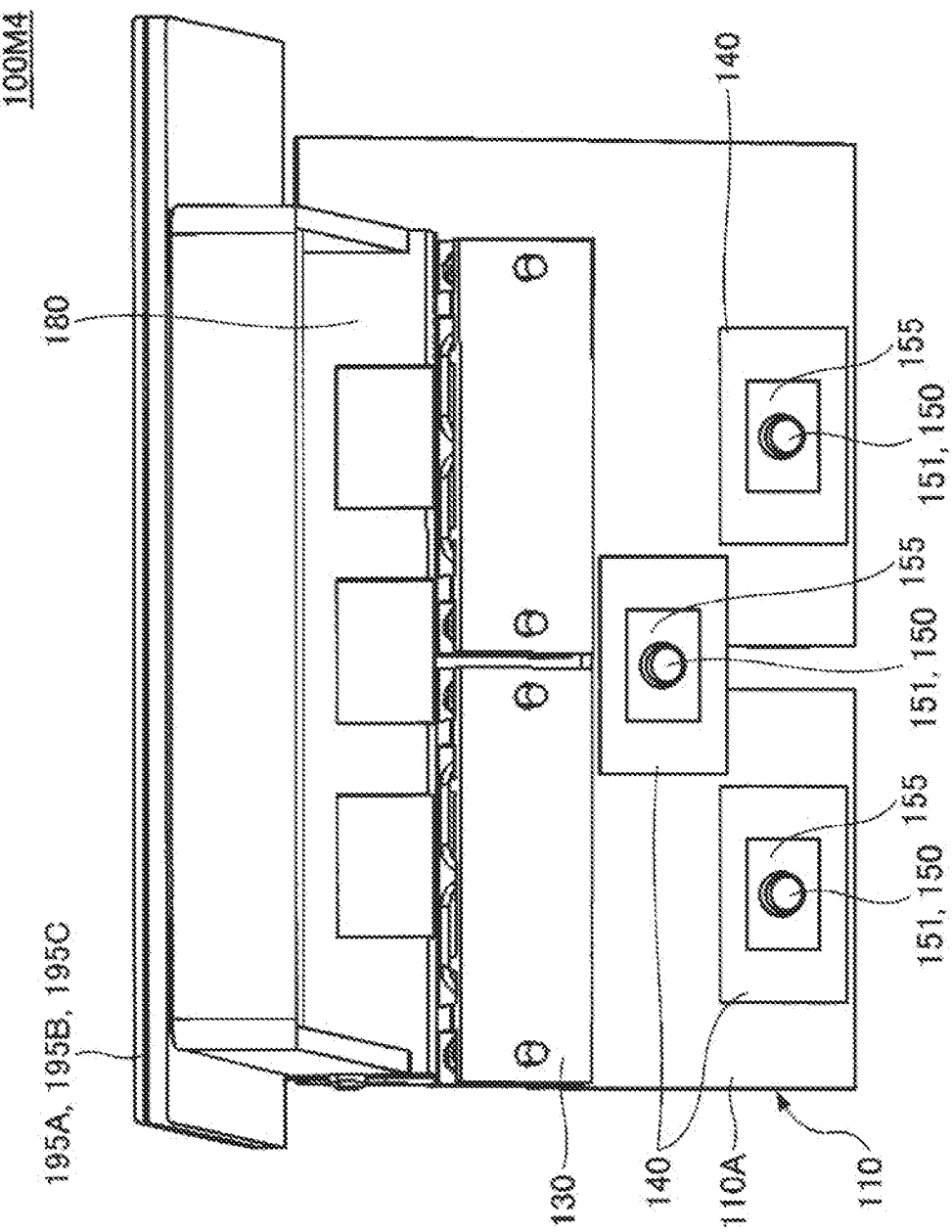
FIG. 16 illustrates an input device according to a fourth modification of the embodiment.
Figure 17:
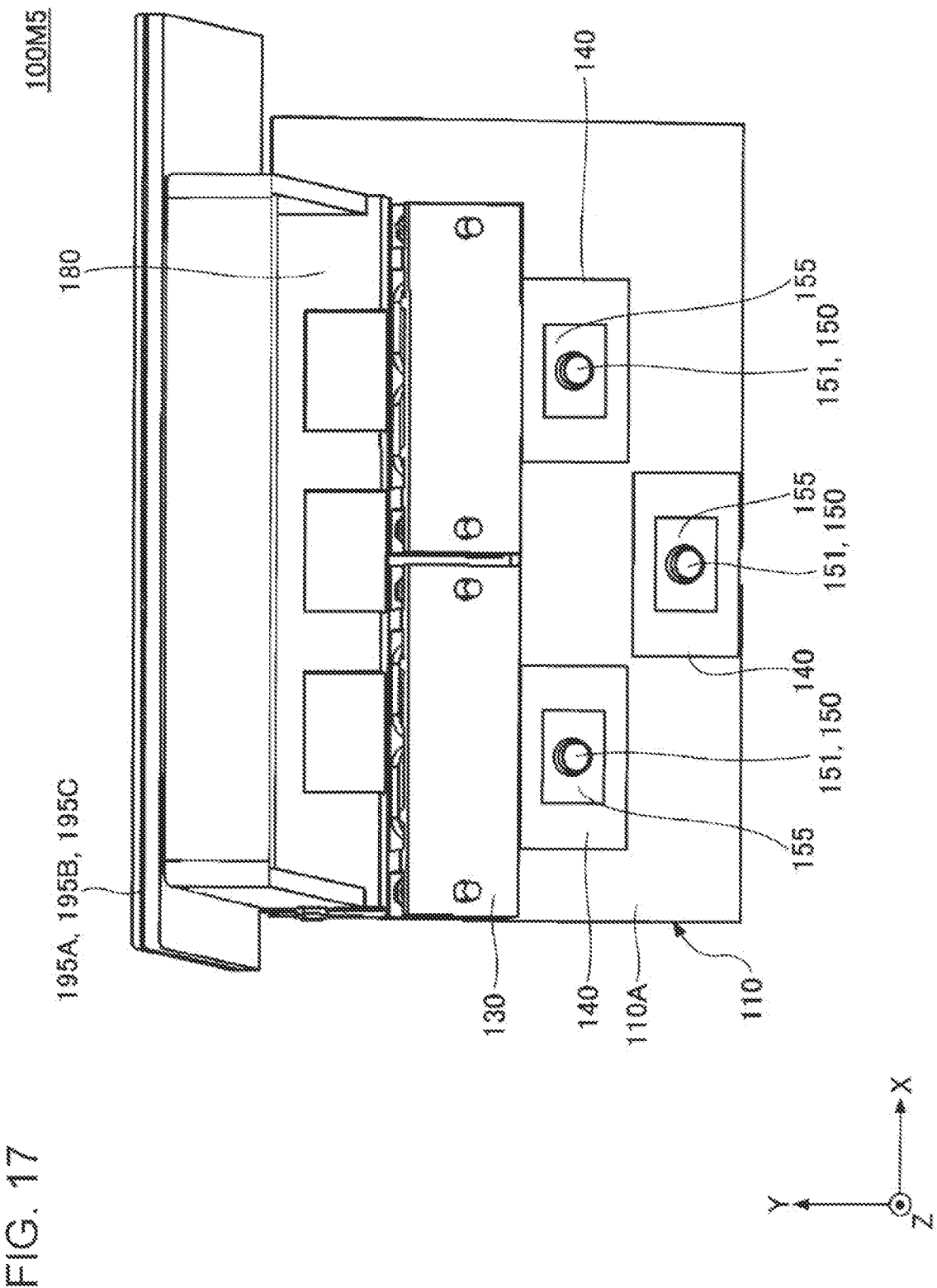
FIG. 17 illustrates an input device according to a fifth modification of the embodiment.

Input devices 100M4 and 100M5 according to the fourth and fifth modifications illustrated in FIGS. 16 and 17, respectively, include three sets of the pressure sensor 150 and the damper 155, and the three sets of the pressure sensor 150 and the damper 155 are arranged in a triangular shape. Two of the three sets of pressure sensors 150 and damper 155 and the remaining one set are located at different positions in the Y direction, which correspond to the distances from the shaft 125. In addition, the two sets of the three sets of pressure sensors 150 and the damper 155 and the remaining one set are located at different positions in the X direction.

As described above, in the input devices 100M4 and 100M5 each including the three sets of pressure sensors 150 and the damper 155, the two pressure sensors 150 are arranged in the Y direction at positions having different distances from the shaft 125. As a result, like the input device 100M1 according to the first modification, the input devices 100M4 and 100M5 can detect in which of the two positions that are on the surface 195C1 of the cover 195C and that have different distances from the shaft 125 the rotation operation has been performed, without using the position detection by the electrostatic sensor 195B.

Furthermore, the cover 195C may be deformed or bent in the X direction when the rotation operation is performed. In this case, the position on the surface 195C1 of the cover 195C at which the rotation operation has been performed can be detected on the basis of the outputs of a total of three pressure sensors 150 arranged in a triangular shape. The outputs of the three pressure sensors 150 have different output characteristics in accordance with the planar distribution of the rigidity of each of the frame 190, the knob 195A, the electrostatic sensor 195B, and the cover 195C, and the distances from the shaft 125. Thus, like the first modification, the position at which the rotation operation can be detected on the basis of the number of operations for detecting the rotation operations based on the outputs of the three pressure sensors 150 and the arrangement pattern of the pressure sensors 150 used to detect the rotation operations.

While the input device and the input module according to the exemplary embodiment of the present invention have been described above, the present invention is not limited to the particularly described embodiments, and various modifications and changes can be made without departing from the scope of the claims.

What is claimed is:

1. An input device comprising:
a fixed member configured to rotatably support a rotation shaft;
an operation unit having one end rotatably supported by the rotation shaft, the operation unit being rotatable relative to the fixed member;
a vibrating element configured to generate vibration of the operation unit in an axial direction of the rotation shaft in response to a rotation operation performed on the operation unit; and
a movable member fixed to the one end of the operation unit, the movable member being rotatable together with the operation unit in response to the rotation operation,
wherein the vibrating element is disposed between the fixed member and the movable member, and
wherein vibration of the operation unit is generated in an axial direction of the rotation shaft by generating the vibration of the movable member in the axial direction of the rotation shaft.

2. The input device according to claim 1, wherein the fixed member includes a basal portion and a linear bush attached to the basal portion and configured to rotatably support the rotation shaft in a movable manner in the axial direction of the rotation shaft.

3. The input device according claim 1, further comprising:
a touch sensor provided in the operation unit.

4. An input device comprising:
a fixed member configured to rotatably support a rotation shaft;
an operation unit having one end rotatably supported by the rotation shaft, the operation unit being rotatable relative to the fixed member;
a vibrating element configured to generate vibration of the operation unit in an axial direction of the rotation shaft in response to a rotation operation performed on the operation unit;

a movable member fixed to the one end of the operation unit, the movable member being rotatable together with the operation unit in response to the rotation operation; and
a detection unit disposed between the fixed member and the movable member, the detection unit detecting the rotation operation performed on the operation unit.

5. The input device according to claim 4, wherein the operation unit having the one end rotatably supported by the rotation shaft has a free end farther away from the rotation shaft than the one end,
wherein the fixed member has an end portion located away from the rotation shaft, and
wherein the operation unit, the rotation shaft, the vibrating element, and the detection unit are sequentially arranged from the free end of the operation unit toward the end portion of the fixed member.

6. The input device according to claim 4, wherein the detection unit is a pressure sensor configured to detect a pressing force caused by the rotation of the movable member relative to the fixed member.

7. The input device according to claim 6, wherein the pressure sensor is provided in plurality.

8. The input device according to claim 7, wherein the plurality of pressure sensors are arranged in a direction away from the rotation shaft.

9. The input device according to claim 7, further comprising:
a plurality of rubber members each disposed between one of the pressure sensors and the movable member,
wherein spring constants of the plurality of rubber members are configured so that threshold values of pressures required for detecting the rotation operation are the same.

10. An input module comprising:
the input device according to claim 4;
a touch sensor provided in the operation unit; and
a control device connected to the input device,
wherein the control device determines that the rotation operation has been performed if an output of the detection unit is greater than or equal to a threshold value and detects a touch position on a basis of an output of the touch sensor, and
wherein the control device decreases the threshold value as the touch position is closer to the rotation shaft and increases the threshold value as the touch position is farther away from the rotation shaft.

11. An input device comprising:
a fixed member configured to rotatably support a rotation shaft;
an operation unit having one end rotatably supported by the rotation shaft, the operation unit being rotatable relative to the fixed member;
a vibrating element configured to generate vibration of the operation unit in an axial direction of the rotation shaft in response to a rotation operation performed on the operation unit; and
a movable member fixed to the one end of the operation unit, the movable member being rotatable together with the operation unit in response to the rotation operation,
wherein the vibrating element includes a stator and a movable element,
wherein the stator is attached to the fixed member, and
wherein the movable element is attached to the movable member.

* * * * *